United States Patent
Seitz et al.

(10) Patent No.: US 8,528,413 B2
(45) Date of Patent: Sep. 10, 2013

(54) PRESSURE SENSOR AND METHOD FOR MANUFACTURING A PRESSURE SENSOR

(75) Inventors: Roland Seitz, Nehren (DE); Peter Kunert, Lichtenstein (DE); Gustav Klett, Moessingen (DE); Matthias Ludwig, Moessingen (DE)

(73) Assignee: Robert Bosch GmbH, Stuttgart (DE)

( * ) Notice: Subject to any disclaimer, the term of this patent is extended or adjusted under 35 U.S.C. 154(b) by 157 days.

(21) Appl. No.: 13/135,841

(22) Filed: Jul. 15, 2011

(65) Prior Publication Data

US 2012/0017692 A1    Jan. 26, 2012

(30) Foreign Application Priority Data

Jul. 22, 2010  (DE) .................. 10 2010 031 679

(51) Int. Cl.
*G01L 9/00*      (2006.01)
(52) U.S. Cl.
USPC ........................................................ 73/753

(58) Field of Classification Search
USPC ................................................... 73/700–756
See application file for complete search history.

(56) References Cited

U.S. PATENT DOCUMENTS

| | | | |
|---|---|---|---|
| 2006/0005628 A1* | 1/2006 | Boyd et al. | 73/729.1 |
| 2011/0138921 A1* | 6/2011 | Colombo et al. | 73/706 |
| 2011/0138924 A1* | 6/2011 | Colombo et al. | 73/756 |
| 2011/0174080 A1* | 7/2011 | Zorzetto et al. | 73/756 |
| 2011/0247420 A1* | 10/2011 | Humpert et al. | 73/700 |

* cited by examiner

*Primary Examiner* — Andre Allen
(74) *Attorney, Agent, or Firm* — Kenyon & Kenyon LLP

(57) ABSTRACT

A peripheral pressure sensor for a motor vehicle has a sensor chip and a gasket sealing a sensing unit of the sensor chip from the surroundings, which gasket has a pressure channel through which pressure information is transmitted to the sensing unit of the sensor chip. The peripheral pressure sensor is made by an injection molding method in which an opening in the gasket is placed on the sensing unit of the sensor chip, and subsequently an assembly of the sensor chip and the gasket is surrounded by extrusion coating such that an outer edge opposite the sensing unit and/or an outer opening in the gasket remains at least partially free.

9 Claims, 4 Drawing Sheets

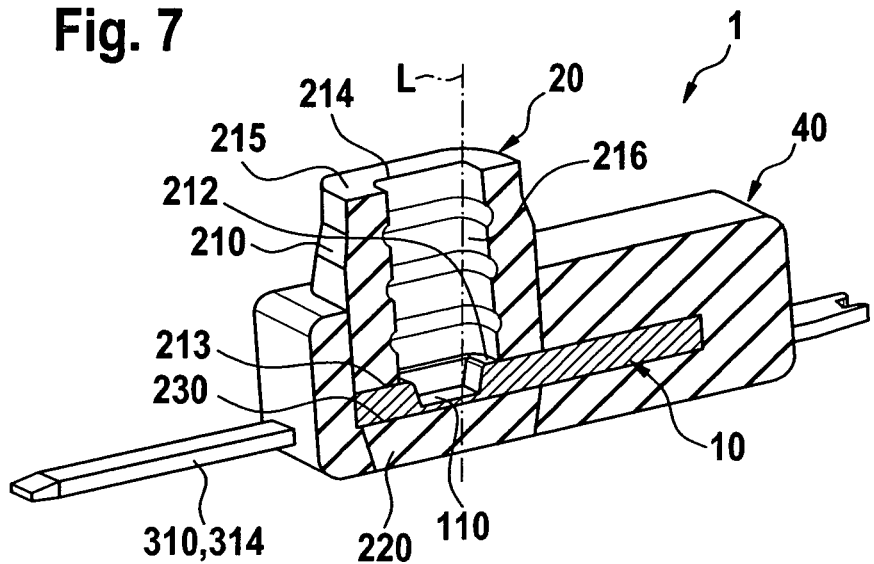
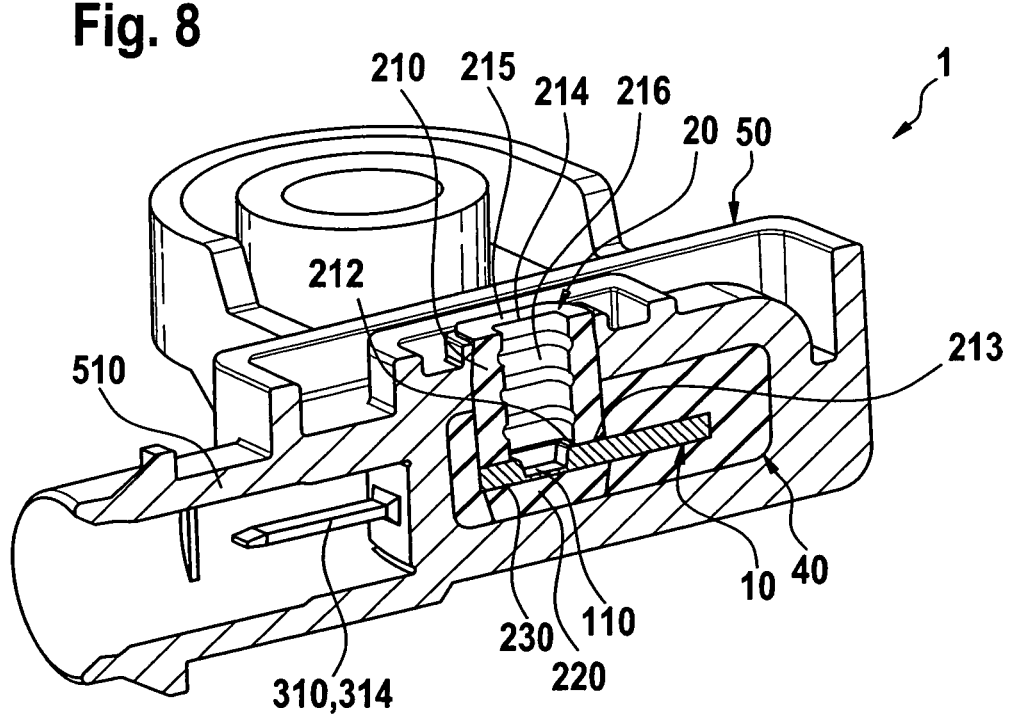

PRESSURE SENSOR AND METHOD FOR MANUFACTURING A PRESSURE SENSOR

BACKGROUND OF THE INVENTION

1. Field of the Invention

The present invention relates to a pressure sensor, in particular a peripheral pressure sensor for a motor vehicle, having a sensor chip and a gasket sealing a sensing device of the sensor chip with respect to the surroundings, and further relates to a method for manufacturing such a pressure sensor.

2. Description of the Related Art

A pressure sensor, in particular a peripheral pressure sensor for protecting the occupants of a motor vehicle, continuously measures a pressure, in particular an internal pressure of a vehicle door, and sends these data to a control unit for an airbag. Such sensors are used in particular to detect a side crash of a vehicle and for this purpose are integrated into the side doors of the vehicle. If the pressure rises in a characteristic manner, the control unit detects a crash, i.e., a side crash, and deploys a corresponding airbag, in particular a corresponding side airbag. Depending on the application in/on the motor vehicle, two or four peripheral pressure sensors are preferably connected electrically to the control unit of the airbag together with peripheral acceleration sensors, for example, such that the combination of two physical measured variables results in a more robust deployment decision for the particular side airbag. This results in rapid and robust sensing of side crashes.

FIG. 1 of the drawings shows a traditional peripheral pressure sensor 1 for a vehicle door of a motor vehicle, a pressure pickup in the form of a sensor chip 10 being accommodated on a circuit board 70. Sensor chip 10 has a sensing device 110, which is sealed by a gasket 20 with respect to a cover 60 and thus also with respect to a housing 50 of pressure sensor 1, so that the electronics on circuit board 70 are protected from harmful media. Cover 60 and also gasket 20 have passage recesses situated coaxially to one another as pressure conducting channels through which pressure information is transmissible to sensing device 110. Such a design of pressure sensor 1 is comparatively complex and cost-intensive in manufacturing. Furthermore, pressure sensor 1 forms a comparatively tall structure, so it cannot be installed in locations offering only a small space.

BRIEF SUMMARY OF THE INVENTION

An object of the present invention is to provide an improved pressure sensor, in particular an improved peripheral pressure sensor for a motor vehicle, and an improved method, preferably an improved injection molding method for manufacturing a pressure sensor, in particular a peripheral pressure sensor for a motor vehicle. The pressure sensor here should be constructed of only a few individual parts and should be inexpensively manufacturable in a few assembly steps. In particular a separate cover and/or circuit board and thus also press contacting of the circuit board should be avoidable. Furthermore, the pressure sensor should be designed to be as small as possible.

The pressure sensor according to the present invention has a sensor chip and a gasket which seals a sensing unit of the sensor chip from the surroundings. According to the present invention, the gasket has a channel or a pipe connection or a vent through which pressure information is transmissible to the sensing unit of the sensor chip. In the method according to the present invention, the pressure sensor also has a sensor chip, an opening in a gasket for a sensing unit of the sensor chip being placed over the sensing unit. According to the present invention, an assembly of sensor chip and gasket is surrounded following the placement of the gasket, in particular is extrusion coated, so that an outer edge of the gasket opposite the sensing unit and/or an outer opening of the gasket remain(s) at least partially free. An extrusion coating or precoating directly adjacent to the pressure channel and/or a housing directly adjacent to the pressure channel may be situated lower on the pressure channel than its outer edge or may essentially end evenly with it.

The gasket and cover having the pressure conducting channel, previously having been separate components in the related art, are combined according to the present invention in a single component, the so-called pressure channel gasket, and the circuit board known from the related art may be omitted. In other words, the pressure sensor according to the present invention is composed of a few individual parts and may thus also be manufactured inexpensively in a few assembly steps. The pressure sensor may be designed to be small, in particular due to the omission of the cover. The features for the method according to the present invention and the pressure sensor according to the present invention are mutually applicable; in other words, a feature of the method may also be employed with the pressure sensor and vice-versa.

According to the present invention, the outer edge and/or the outer opening of the gasket is/are at least partially freely accessible form the outside in the case of a functional or ready-to-use pressure sensor. In this way, the outer edge and/or the outer opening of the gasket may be installed opposite a certain location on a device, which in the case of a motor vehicle may be, for example, an inside of a vehicle door. An inner opening in the gasket or the pressure channel is placed on/over the sensing unit of the sensor chip. In preferred specific embodiments of the present invention, the gasket has a passage recess within which the sensor chip is placed at least partially. The gasket may be designed in such a way that the pressure channel is provided on one side of the sensor chip, and a base of the gasket is provided on a side of the sensor chip opposite this side. The passage recess and the pressure channel are preferably essentially orthogonal to one another, so that the passage recess may be bordered on two opposite sides by the pressure channel and the base and on two sides essentially orthogonal thereto by webs connecting the pressure channel to the base.

The entire gasket preferably has approximately the shape of a pipe connection or approximately the shape of a sleeve. The pipe connection or the sleeve has the passage recess on a longitudinal end section of the gasket, which is closed in the longitudinal direction, so that the sensor chip together with an electrical contact unit, if necessary, is inserted into the passage recess in the gasket or the passage recess of the gasket is placed on the sensor chip. In specific embodiments of the present invention, a complete housing of the pressure sensor is designed as one piece, in particular of a single material, i.e., the pressure sensor does not have a cover. The sensor chip here may be installed directly in the pressure sensor, preferably without a mounting substrate such as a circuit board, for example, directly in the gasket for the sensor chip. Furthermore, the gasket or the pressure channel of the gasket, the extrusion coating or precoating and/or the housing may be manufactured of materials from the same group of materials. Preferred groups of materials include silicones or thermoplastics.

The assembly of sensor chip and gasket is preferably provided with an extrusion coating or precoating and/or a housing, in particular an extrusion coating. The extrusion coating or precoating directly adjacent to the outer edge of the gasket and/or the housing directly adjacent to the outer edge of the gasket is/are preferably positioned lower with respect to the outer edge or essentially end evenly with it. In preferred specific embodiments of the present invention, the gasket is compressed in its longitudinal direction in manufacturing the pressure sensor, in particular in applying the extrusion coating or precoating and/or in coating of the housing. A core or mandrel supporting the gasket on the inside in the manufacture of the pressure sensor is preferably provided in a pressure conducting channel of the gasket, which conducts pressure information to the sensing unit of the sensor chip in subsequent use of the pressure sensor. The core or mandrel here is preferably dimensioned in its longitudinal direction in such a way that there remains a distance within the pressure-conducting channel from the sensor chip or the sensing unit of the sensor chip in the manufacture of the pressure sensor.

BRIEF DESCRIPTION OF THE DRAWINGS

FIG. 7 shows the pressure sensor from FIG. 6 in a sectional view.

FIG. 8 shows the pressure sensor according to the present invention having a housing tailored to customer needs in a sectional perspective view.

DETAILED DESCRIPTION OF THE INVENTION

With reference to FIGS. 2 through 8, the manufacture and design of a specific embodiment of a pressure sensor 1 according to the present invention are described in greater detail below. It is naturally possible to design and manufacture pressure sensor 1 in a different way, for example, a gasket 20 for pressure sensor 1 may be designed in a completely different way. It is possible, for example, to omit a base 220 and, if necessary, also two webs 240 of gasket 20. In addition, gasket 20 may have a different cross section, for example. Furthermore, it is naturally possible to apply the present invention to a pressure sensor 1 in circuit board technology, or it is possible, for example, not to manufacture pressure sensor 1 by an injection molding method or not to use a two-component injection molding method.

Figure 2:
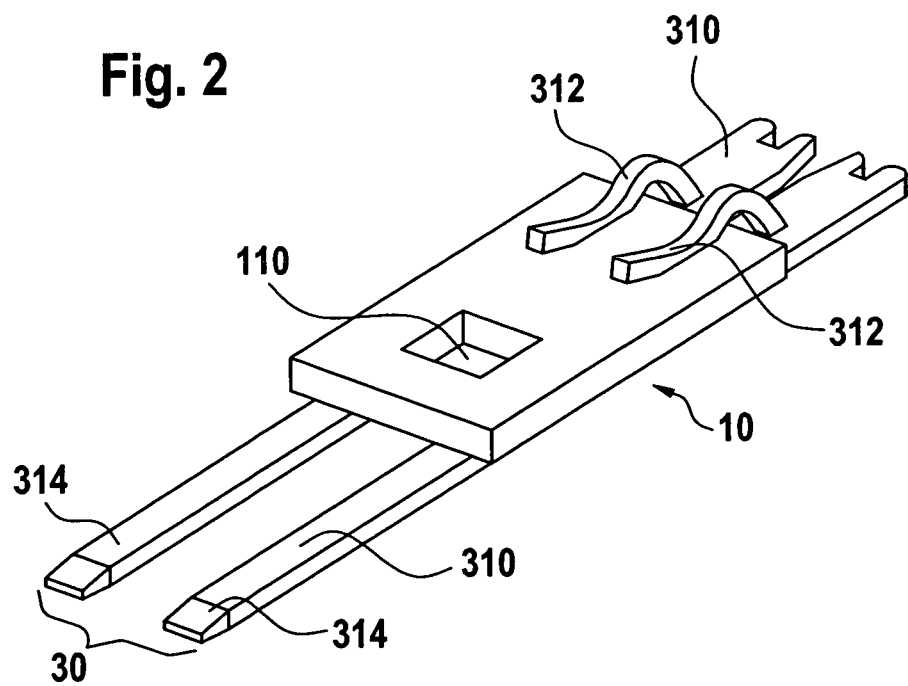
FIG. 2 shows in a perspective view a sensor chip for a pressure sensor according to the present invention contacted electrically by a contact pair.

FIG. 2 shows a sensor chip 10 for a pressure sensor 1 according to the present invention, in particular a peripheral pressure sensor 1 according to the present invention, the sensor chip being electrically contacted by an electrical contact pair 30. Sensor chip 10 has a sensing unit 110 designed as an electrical or electronic pressure pickup, so that electrical signals generated by sensing unit 110 may be picked up via contact pair 30. Contact pair 30 preferably includes two electrical contact units 310, a single contact unit 310 having a spring terminal 312 and sensor chip 10 being clampable between spring clamp 312 and actual contact unit 310. It is preferable here that this also implements electrical contacting of contact unit 310 with sensor chip 10, preferably accomplished by corresponding spring clamp 312. Furthermore, each contact unit 310 has an electrical contact 314, preferably designed as a pin contact 314 on which electrical signals of sensor chip 10 may be picked up.

Figure 3:
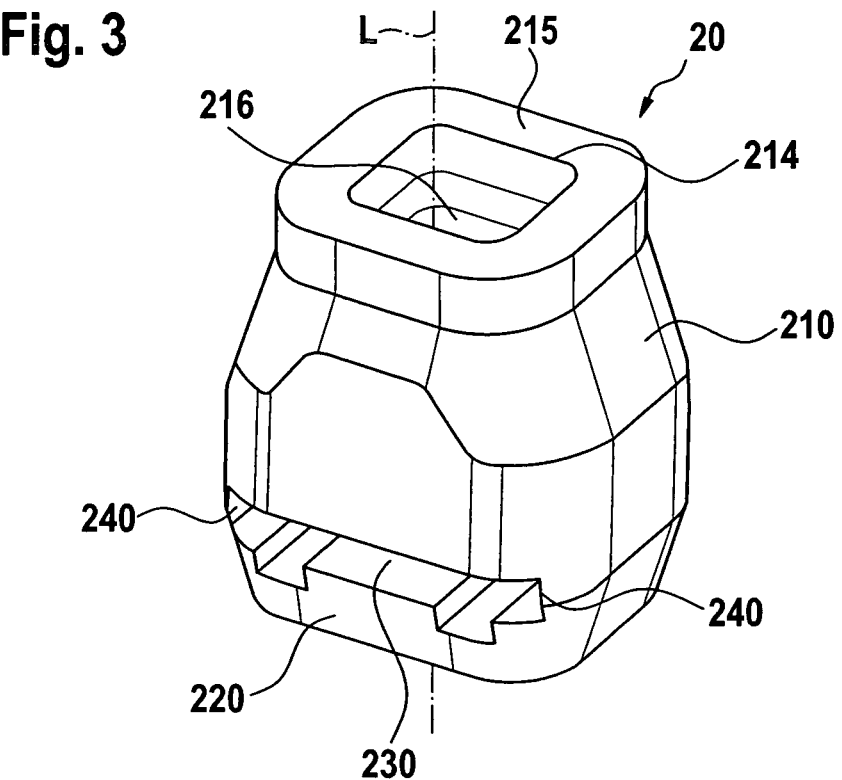
FIG. 3 shows a perspective view of a gasket or pressure channel gasket for the pressure sensor according to the present invention shown in FIG. 2.

FIG. 3 shows a gasket 20 according to the present invention, i.e., pressure channel gasket 20 according to the present invention, making it possible in a finished pressure sensor 1 (see FIG. 6 or 8) to send pressure information to sensing unit 110 of sensor chip 10. According to the present invention, this is made possible by gasket 20 alone, i.e., it is not necessary to have a cover or a housing section additionally relaying the pressure information. Gasket 20, having an approximately square or rectangular horizontal projection, has a pronounced extent in one longitudinal direction L along which the pressure information is also conveyable. For this purpose, gasket 20 has a pressure channel 210, which may also be referred to as a snorkel, vent or pipe connection. Furthermore, gasket 20 has a passage recess 230, which is situated essentially orthogonally to longitudinal direction L of pressure channel 210, separating pressure channel 210 from base 220 of gasket 20. Base 220 is preferably integrally unified via webs 240 having pressure channel 210. Gasket 20 is preferably constructed at least partially of silicone and/or a thermoplastic.

In a functional pressure sensor 1, sensor chip 10 together with its electrical contact units 310 can be accommodated at least partially in passage recess 230. It is preferable here for a corresponding section of sensor chip 10 together with its contact units 310 to be accommodated in a form-fitting manner in correspondingly shaped passage recess 230 (see FIG. 4). Pressure channel 210 connected to base 220 and passage recess 230 lies with its inner opening 212 directly on passage recess 230, i.e., passage recess 230 and a pressure conducting channel 216 of gasket 20 or pressure channel 210 are in a through-connection via inner opening 212. In pressure sensor 1, inner opening 212 is then facing sensor chip 10 and sensing unit 11, and pressure channel 210 sits with an inner edge 213 on sensor chip 10, this edge surrounding sensing unit 110, preferably tightly. Opposite inner opening 212, pressure channel 210 has an outer opening 214 facing away from sensor chip 10, i.e., sensing unit 11, and is bordered by an outer edge 215 of pressure channel 210. Pressure information may enter pressure channel 210 through outer opening 214.

Figure 4:
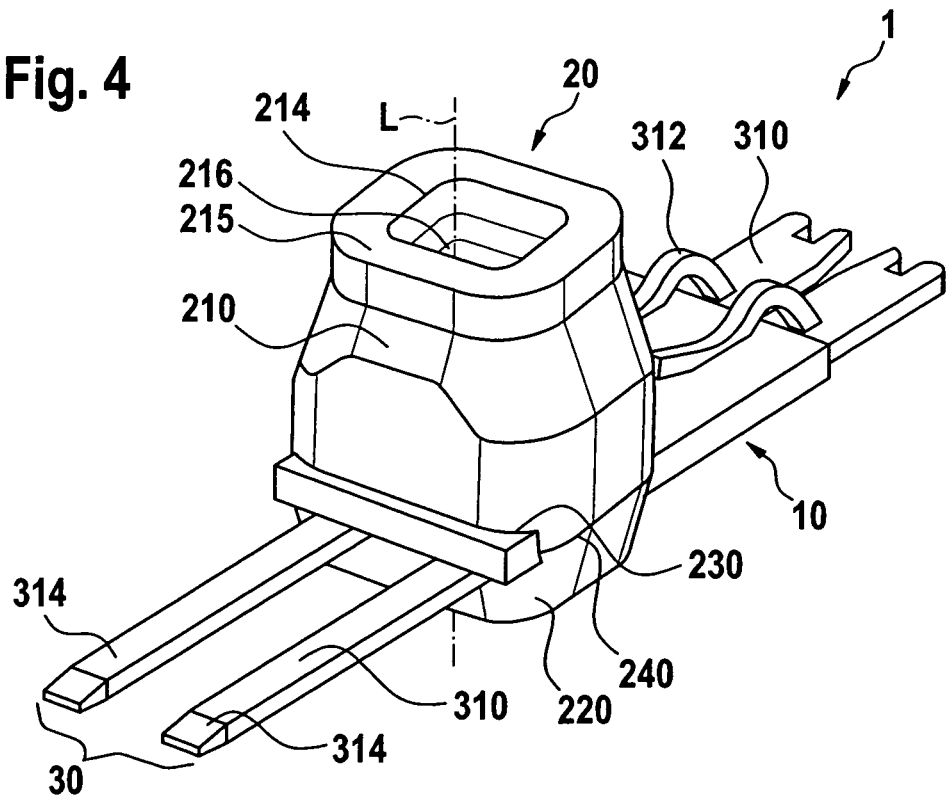
FIG. 4 shows a perspective view of the gasket or pressure channel gasket of FIG. 3 mounted on the sensor chip of FIG. 2.
Figure 5:
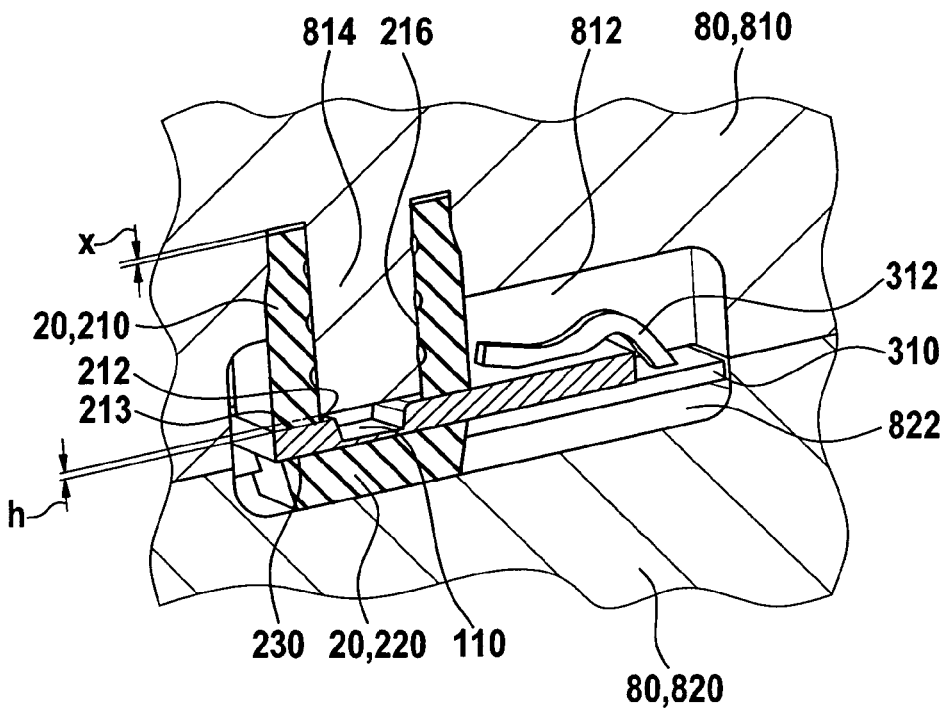
FIG. 5 shows a configuration of sensor chip and gasket from FIG. 4 in a state inserted into a closed cast mold in a lateral sectional diagram.
Figure 6:
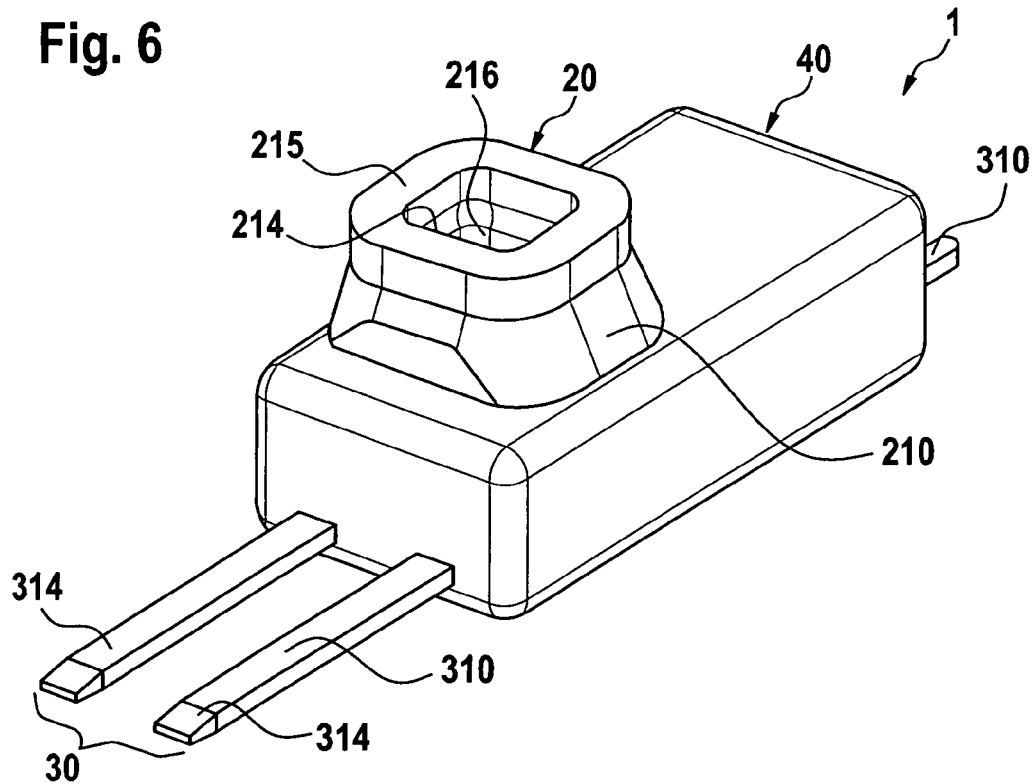
FIG. 6 shows a functional pressure sensor according to the present invention in a three-dimensional diagram.

A sealing concept of pressure conducting channel 216 through which a fluid pressure is supplied to sensing unit 110 is essential in pressure sensors 1. This is implemented according to the present invention by cast-coating/extrusion coating or cast-precoating/extrusion precoating an assembly 10, 20 of sensor chip 10 and gasket 20. A two-component injection molding method is preferably used here, making it possible to minimize pressure sensor 1 to be manufactured and its complexity. An extrusion coating 40 or precoating 40 is preferably performed using a material from the same group of materials as gasket 20. FIG. 4 shows assembly 10, 20 of sensor chip 10 and gasket 20, as inserted into an injection mold 80, a condition of assembly 10, 20 inserted into injection mold 80 being shown in FIG. 5. FIGS. 6 and 7 then show a functional pressure sensor 1 having extrusion coating 40 or precoating 40.

According to the present invention, gasket 20 is designed in such a way that a mechanical pressure is applied to gasket 20 by a projection x of gasket 20 or of pressure channel 210 in injection mold 80, in particular an upper mold 810 (first injection mold 810), this pressure being adjustable over an amount of an overlap x. In this way, a force between gasket 20 and sensor chip 10 is applied, so that through this seal an inner area within gasket 20 is not squirted out. Furthermore, the inner area of gasket 20 may be supported by a core 814 or mandrel 814 in injection mold 80 to prevent collapse of pressure channel 210. Core 814 here is preferably dimensioned in such a way that it is a distance h away from the sensor chip when it is inserted into pressure channel 210, so that damage to sensor chip 10 is preventable.

Gasket 20 and extrusion coating 40 are preferably manufactured from a soft material, for example, silicone or a thermoplastic elastomer, tolerances being compensated by gasket 20 and gasket 20 being adaptable to a surface property of sensor chip 10, so that a good seal is ensured. Thus if both gasket 20 and extrusion coating 40 are manufactured from materials of the same group, a discrete separation between these two components 20, 40 disappears in the injection molding process. Thus, in the case of crosslinking materials, for example, silicones, both components 20, 40 undergo crosslinking; in the case of thermoplastics, gasket 20 softens and bonds to extrusion coating 40.

For extrusion coating 40, both injection molds 810, 820 preferably have cavities 812, 822, which are flush with one another and together form a border for extrusion coating 40. Furthermore, a recess 816 for pressure channel 210 into which pressure channel 210 is insertable in the injection molding operation is also situated in upper mold 810 on cavity 812 connected at the top. Core 814 is then centered within recess 812. Furthermore, functional pressure sensor 1 may be accommodated in a housing 50, for example, in a housing extrusion coating 50, such that housing 50 may be adapted to customer needs (see FIG. 8). Housing 50 may then also provide a plug face or a connection device 510 for electrical contacting of contact units 310.

Figure 1:
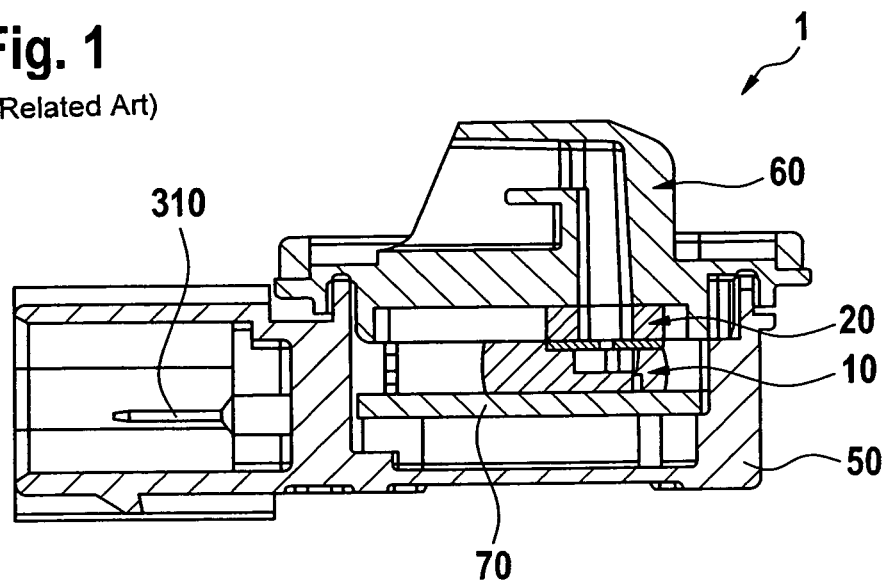
FIG. 1 shows in a lateral sectional view a pressure sensor according to the related art based on circuit board technology for a side door of a motor vehicle.

According to the present invention, an access to a sensor chip is created during the injection molding operation and not via components to be installed, for example, a cover (see also the description of FIG. 1 above). Due to the implementation of a design according to the present invention in the injection molding operation, this eliminates assembly of a gasket with a cover. Furthermore, the number of individual parts is reduced, so that manufacturing may proceed more rapidly, not only due to the injection molding method used. The pressure sensor according to the present invention has a less complex design and yields a cost reduction in comparison with the related art. The gasket is manufactured as a separate part according to the present invention and is then subsequently plugged onto the sensor chip, so that a simple injection mold may be used for the gasket. Furthermore, it is possible to perform production of the gasket at a spatially separate location without any special requirements. The gasket also permits simple further processing using a simple injection mold.

What is claimed is:

1. A peripheral pressure sensor for a motor vehicle, comprising:
    a sensor chip having a sensing unit; and
    a gasket surrounding the sensing unit of the sensor chip with respect to surroundings, wherein the gasket has a pressure channel through which pressure information is transmitted to the sensing unit of the sensor chip.

2. A peripheral pressure sensor for a motor vehicle, comprising:
    a sensor chip having a sensing unit; and
    a gasket surrounding the sensing unit of the sensor chip with respect to surroundings, wherein the gasket has a pressure channel through which pressure information is transmitted to the sensing unit of the sensor chip;
    wherein:
        the pressure channel of the gasket has an inner opening and an outer edge surrounding an outer opening, the inner opening being placed on the sensing unit of the sensor chip, and at least one of the outer edge being placed opposite the sensing unit and the outer opening of the pressure channel being at least partially freely accessible from the outside; and
        at least one of an extrusion coating and a housing directly adjacent to the pressure channel being positioned lower on the pressure channel than the outer edge of the pressure channel.

3. A peripheral pressure sensor for a motor vehicle, comprising:
    a sensor chip having a sensing unit; and
    a gasket surrounding the sensing unit of the sensor chip with respect to surroundings, wherein the gasket has a pressure channel through which pressure information is transmitted to the sensing unit of the sensor chip;
    wherein the gasket has a passage recess in which the sensor chip is at least partially placed, and wherein the gasket is configured in such a way that the pressure channel is provided on a first side of the sensor chip and a base of the gasket is provided on a second side of the sensor chip opposite the first side.

4. The pressure sensor as recited in claim 3, wherein longitudinal extents of the passage recess and the pressure channel of the gasket are essentially orthogonal to one another, and wherein the passage recess is bordered on first two sides which are opposite one another by the pressure channel and the base of the gasket, and wherein the passage recess is bordered on second two sides essentially orthogonal to the first two sides by webs connecting the pressure channel to the base of the gasket.

5. The pressure sensor as recited in claim 3, wherein:
    the gasket has approximately the shape of one of a pipe connection or a sleeve, the one of the pipe connection or the sleeve being closed at one end in the longitudinal direction of the gasket;
    the one of the pipe connection or the sleeve has the passage recess transversely on a longitudinal end section of the gasket closed in the longitudinal direction; and
    the sensor chip is inserted into the passage recess of the gasket.

6. The pressure sensor as recited in claim 1, wherein at least one of:
    i) a complete housing of the pressure sensor is configured in one piece;
    ii) the sensor chip is installed directly in the pressure sensor; and
    iii) the gasket is made of one of a silicone or a thermoplastic.

7. An injection molding method for manufacturing a peripheral pressure sensor, comprising:
    providing a sensor chip having a sensing unit;
    placing an opening of a gasket on the sensing unit of the sensor chip;
    subsequently extrusion-coating an assembly of the sensor chip and the gasket such that at least one of an outer edge of the gasket opposite the sensing unit and an outer opening in the gasket remains at least partially free.

8. The method as recited in claim 7, wherein the extrusion coating directly adjacent to the outer edge of the gasket is positioned lower than the outer edge of the gasket.

9. The method as recited in claim 7, wherein:
the gasket is compressed in a longitudinal direction in applying the extrusion coating; and
a core is provided in a pressure conducting channel of the gasket, the pressure conducting channel being configured to conduct pressure information to the sensing unit of the sensor chip, the core supporting the gasket in the manufacture of the pressure sensor, and the core being dimensioned in a longitudinal direction such that the core is a predetermined distance away from the sensor chip.

\* \* \* \* \*